(12) United States Patent
Schield

(10) Patent No.: US 6,391,070 B2
(45) Date of Patent: May 21, 2002

(54) ANTI-STATIC ADDITIVE COMPOSITIONS FOR HYDROCARBON FUELS

(75) Inventor: John A. Schield, Missouri City, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/836,071

(22) Filed: Apr. 16, 2001

Related U.S. Application Data

(60) Provisional application No. 60/199,075, filed on Apr. 20, 2000.

(51) Int. Cl.⁷ .............................. C10L 1/18; C10L 1/22; C10L 1/24
(52) U.S. Cl. .............................. 44/351; 44/386; 44/393; 44/394; 44/397; 44/403; 44/412; 44/422
(58) Field of Search .................. 44/386, 393, 394, 44/397, 412, 403, 422, 433

(56) References Cited

U.S. PATENT DOCUMENTS

| | | | | |
|---|---|---|---|---|
| 2,853,373 A | * | 9/1958 | Stuart | |
| 3,062,630 A | * | 11/1962 | Piazza | |
| 3,186,810 A | * | 6/1965 | Dunworth | |
| 3,578,421 A | * | 5/1971 | Andress et al. | |
| 3,578,422 A | * | 5/1971 | Dorer, Jr. | |
| 3,652,238 A | * | 3/1972 | Bialy et al. | |
| 3,677,724 A | * | 7/1972 | Andress | |
| 3,677,725 A | * | 7/1972 | Andress | |
| 3,807,977 A | * | 4/1974 | Johnston et al. | |
| 3,811,848 A | * | 5/1974 | Johnson | |
| 3,820,963 A | * | 6/1974 | Moore et al. | |
| 3,917,466 A | * | 11/1975 | Henry, Jr. | |
| 4,029,480 A | | 6/1977 | Johnston | |
| 4,182,810 A | * | 1/1980 | Willcox | 526/64 |
| 4,211,534 A | * | 7/1980 | Feldman | |
| 4,356,002 A | | 10/1982 | Knepper et al. | |
| 4,416,668 A | * | 11/1983 | Thompson | |
| 4,491,651 A | * | 1/1985 | Naiman | 525/187 |
| 4,537,601 A | * | 8/1985 | Naiman | |
| 4,647,291 A | | 3/1987 | Eckert | |
| 5,254,138 A | * | 10/1993 | Kurek | |
| 5,672,183 A | | 9/1997 | Schield | |

\* cited by examiner

*Primary Examiner*—Margaret Medley
(74) *Attorney, Agent, or Firm*—Madan, Mossman & Sriram, P.C.

(57) ABSTRACT

It has been discovered that less expensive, and in some cases synergistically effective anti-static additive blends may be added to hydrocarbon fuels to improve the conductivity thereof. The blend includes an anti-static amount of at least one hydrocarbon soluble copolymer of an alkylvinyl monomer and a cationic vinyl monomer and an anti-static amount of at least one hydrocarbon soluble polysulfone copolymer of at least one olefin and sulfur dioxide. Optional ingredients include polymeric polyamines and aryl sulfonic acids.

27 Claims, No Drawings

ANTI-STATIC ADDITIVE COMPOSITIONS FOR HYDROCARBON FUELS

This Application claim benefit to Provisional Application 60/199,075, filed Apr. 20, 2000.

FIELD OF THE INVENTION

The present invention relates to methods and compositions for increasing hydrocarbon conductivity, and more particularly relates, in one embodiment, to blends of halogen-free acrylate copolymer compositions with polysulfone copolymers that increase the conductivity of liquid hydrocarbons, such as solvents and fuels, and thereby control the build-up of potentially hazardous static charges in such liquids, and to methods of making and using such compositions.

BACKGROUND OF THE INVENTION

It is widely known that electrostatic charges can be frictionally transferred between two dissimilar, nonconductive materials. When this occurs, the electrostatic charge thus created appears at the surfaces of the contacting materials. The magnitude of the generated charge is dependent upon the nature of and, more particularly, the respective conductivity of each material.

Perhaps the most well-known examples of electrostatic charge build-up include those which occur when one shuffles across a carpeted floor or when one runs one's hand across another's hair or the fur of an animal. Although it is less commonly known, electrostatic charging can also occur when a solid is mixed with a liquid and when water settles through a hydrocarbon solution. It is the latter situations that are of greatest interest to the petroleum industry, for when such charges are built up in or around flammable liquids, their eventual discharge can lead to incendiary sparking, and perhaps to a serious fire or explosion.

While incendiary sparking is an ubiquitous problem in the petroleum industry, the potential for fire and explosion is probably at its greatest during product handling, transfer and transportation. For example, static charges are known to accumulate in solvents and fuels when they flow through piping, especially when these liquids flow through high surface area or "fine" filters and other process controls such as is common during tank truck filling. Countermeasures designed to prevent accumulation of electrostatic charges on a container being filled and to prevent sparks from the conducting container to ground can be employed, such as container grounding (i.e. "earthing") and bonding. But it has been recognized that these measures are inadequate to deal successfully with all of the electrostatic hazards presented by hydrocarbon fuels.

Alone, grounding and bonding are not sufficient to prevent electrostatic build-up in low conductivity, volatile organic liquids such as distillate fuels like diesel, gasoline, jet fuel, turbine fuels and kerosene. Similarly, grounding and bonding do not prevent static charge accumulation in relatively clean (i.e. contaminant free) light hydrocarbon oils such as organic solvents and cleaning fluids. This is because the conductivity of these organics is so low that a static charge moves very slowly through these liquids and can take a considerable time to reach the surface of a grounded, conductive container. Until this occurs, a high surface-voltage potential can be achieved which can create an incendiary spark. ignition or explosion can thus occur in an environment of air-hydrocarbon vapor.

One can directly attack the source of the increased hazard presented by these low conductivity organic liquids by increasing the conductivity of the liquid with additives. The increased conductivity of the liquid will substantially reduce the time necessary for any charges that exist in the liquid to be conducted away by the grounded inside surface of the container. Various compositions are known for use as liquid hydrocarbon additives to increase the electrical conductivity of these liquids. For example, in U.S. Pat. Nos. 3,578,421; 3,677,724; 3,807,977; 3,811,848; and 3,917,466 there are described anti-static additives generally of the alpha-olefin-sulfone copolymer class. In U.S. Pat. No. 3,677,725 an anti-static additive of the alpha-olefin-maleic anhydride copolymer class is described. Anti-static amines and methyl vinyl ether-maleic anhydride copolymers are described in U.S. Pat. No. 3,578,421. Still further, anti-static aliphatic amines-fluorinated polyolefins are described in U.S. Pat. No. 3,652,238. Similarly, anti-static chromium salts and amine phosphates are disclosed in U.S. Pat. No. 3,758,283. And, in U.S. Pat. No. 4,333,741 there are disclosed olefin-acrylonitrile copolymers for use as anti-static additives in hydrocarbons.

The olefin-acrylonitrile copolymeric compositions, as indicated above, have proved effective as anti-static agents or "static dissipators," as they are also known, when combined with volatile liquid hydrocarbons.

In the past, halogen-containing compositions introduced into fuels have played a significant role in achieving anti-static properties in fuels. While these halogen-containing compositions are effective as anti-static agents, in certain situations, some halogen-containing hydrocarbon compounds have been linked to human and animal health risks as well as environmental degradation. Legislative enactments, including the 1990 amendment to "The Clean Air Act" in the United States, signal a trend away from the continued permissible use in some media of compositions containing halogens. Even where the use of halogen-containing compositions is still permitted, stringent regulations often govern the use, storage and, in particular, the disposal of and/or treatment of waste streams containing these compositions. Such factors call into question the continued practical and economic feasibility of anti-static agents containing halogens without regard to the media being treated.

Other prior art compositions have necessarily contained as much as about 10% (by weight of active ingredients) sulfur in a form that increases or creates sulfur contamination of the fuels or other fluids upon their addition thereto. Sulfur in various forms, such as sulfur dioxide, is known as an undesirable contaminant. Its undesirability is due to a variety of reasons, including the problems it causes in handling and its interference with, or undesirable side effects encountered in, the end uses of the sulfur-contaminated fluid. While the presence of sulfur in certain forms in certain fluids is acceptable, it is preferred to minimize the presence of sulfur.

U.S. Pat. No. 5,672,183 concerns a composition having increased electrical conductivity, comprising a liquid hydrocarbon and an anti-static amount of a hydrocarbon soluble copolymer of an alkylvinyl monomer and a cationic vinyl monomer. The copolymer has an alkylvinyl monomer unit to cationic vinyl monomer unit ratio of from about 1:1 to about 10:1, and an average molecular weight of from about 800 to about 1,000,000.

A need has therefore clearly arisen for an effective, low cost anti-static agent that is useful with a wide variety of volatile hydrocarbon liquids. It is especially desirable in many situations that the agent be free of halogens.

SUMMARY OF THE INVENTION

Accordingly, it is an object of the present invention to provide a novel liquid hydrocarbon composition having increased electrical conductivity.

It is another object of the present invention to provide a method to effectively reduce accumulated static electrical charge on a surface of a liquid hydrocarbon.

In carrying out these and other objects of the invention, there is provided, in one form, a composition having increased electrical conductivity, which includes a) a liquid hydrocarbon; b) an anti-static amount of at least one hydrocarbon soluble copolymer of an alkylvinyl monomer and a cationic vinyl monomer, wherein the copolymer has an alkylvinyl monomer unit to cationic vinyl monomer unit ratio of from about 1:1 to about 10:1, the copolymer having an average molecular weight of from about 800 to about 1,000,000; and c) an anti-static amount of at least one hydrocarbon soluble polysulfone copolymer of at least one olefin and sulfur dioxide.

Among the several advantages found to be achieved by the present invention, therefore, may be noted the provision of a composition and method that provides improved anti-static properties for a variety of media; the provision of such composition and method that does not require the use of halogens in all situations; the provision of such composition and method that allows use of lower levels of sulfur, reduction of the use of sulfur in an environmentally unacceptable form; and the provision of such composition that may be produced with relatively low cost and waste.

DETAILED DESCRIPTION OF THE INVENTION

It has been discovered that a blend of at least one hydrocarbon soluble copolymer of an alkylvinyl monomer and a cationic vinyl monomer with at least one hydrocarbon soluble polysulfone copolymer of at least one olefin and sulfur dioxide can provide a composition, which can increase the electrical conductivity of a hydrocarbon fluid that it is mixed with. While each of these components is known separately as an anti-static additive for hydrocarbon fuels, it has been discovered that better conductivity may be obtained with the blends, in some cases, than can be obtained with each copolymer separately. That is, a synergistic effect may be observed. Further, the use of a copolymer of an alkylvinyl monomer and a cationic vinyl monomer in the blend permits less of the polysulfone copolymer to be used. The polysulfone copolymer is a relatively more expensive copolymer, and it contains sulfur dioxide. As noted, the proportion of sulfur dioxide is desired to be minimized. Further, the blends of this invention have an absence of halogen atoms.

Within the context of this invention, it should be understood that the terms "hydrocarbon liquid" and "hydrocarbon fluid" are synonymous and that these terms encompass conventional hydrocarbon fuels as well as oxygenated fuels (e.g. methanol, ethanol, etc.) and blends thereof. It is also expected that the compositions of the invention may find use as antistatic additives in fuels to be developed in the future.

The hydrocarbon soluble copolymer of an alkylvinyl monomer and a cationic vinyl monomer is described in and may be made by the procedures of U.S. Pat. No. 5,672,183, the entirety of which is incorporated by reference herein. In a preferred embodiment, the copolymer has an alkylvinyl monomer unit to cationic vinyl monomer unit ratio of from about 1:1 to about 10:1, the copolymer having an average molecular weight of from about 800 to about 1,000,000. In another embodiment, the cationic vinyl monomer is a cationic quaternary ammonium vinyl monomer, and in a preferred embodiment is a cationic quaternary ammonium acrylate monomer or a cationic quaternary ammonium methacrylate monomer. In another embodiment, the cationic vinyl monomer corresponds to the formula:

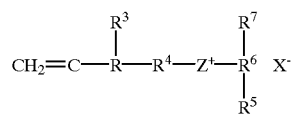

where Z is selected from the group consisting of nitrogen, phosphorus and sulfur, X is a nonhalogen atom, R is selected from the group consisting of —C(=O)O—, —C(=O)NH—, straight chain and branched alkylene groups, divalent aromatic groups and divalent alicyclic groups, $R^3$ is selected from the group consisting of hydrogen and methyl, $R^4$ is a straight chain or branched alkylene of up to about twenty carbon atoms ($C_1$-$C_{20}$), and $R^5$, $R^6$ and $R^7$ are independently each a straight chain or branched alkyl of up to about twenty carbon atoms, provided however that if Z is sulfur $R^7$ is absent. Optionally, a copolymer of an alkyl vinyl monomer and a nitrile-containing monomer may be used in conjunction with the copolymer of alkylvinyl monomer and cationic vinyl monomer.

Further, the hydrocarbon soluble polysulfone copolymer is described in and may be made by the procedures of U.S. Pat. No. 3,917,466, the entirety of which is incorporated by reference herein. In a preferred embodiment, the hydrocarbon soluble polysulfone copolymer of at least one olefin and sulfur dioxide includes about 50 mol percent of units from sulfur dioxide, about 40 to 50 mol percent of units derived from one or more 1-alkenes each having from about 6 to 24 carbon atoms, and from about 0 to 10 mol percent of units derived from an olefinic compound having the formula ACH=CHB wherein A is a group having the formula —($C_xH_{2x}$)—COOH wherein x is from 0 to about 17, and B is hydrogen or carboxyl, with the proviso that when B is carboxyl, x is 0, and wherein A and B together can be a dicarboxylic anhydride group. The molecular weight of the polysulfone copolymer may range from about 10,000 to about 500,000, in one non-limiting embodiment, and preferably from about 200,000 to about 300,000.

An optional component of the anti-static blend of this invention is a polymeric polyamine. The polyamine is also an anti-static agent, and preferably has the formula

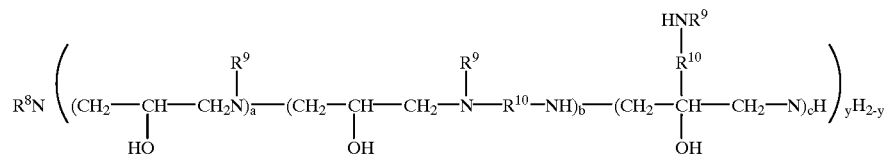

where
$R^9$ is an aliphatic hydrocarbyl group of 8 to 24 carbon atoms,
$R^{10}$ is an alkylene group of 2 to 6 carbon atoms,
$R^8$ is $R^9$, or an n-aliphatic hydrocarbyl alkylene group of the formula $R^9NHR^{10}$,
a is an integer of 0 to 20,
b is an integer of 0 to 20,
c is an integer of 0 to 20, and
y is an integer of 1 to 2,
with the proviso that when $R^8$ is $R^9$ then a is an integer of 2 to 20 and b=c=0, and when R is $R^9NH-R^{10}$ then a is 0 and b+c is an integer of 2 to 20.

An arylsulfonic acid may also be present, where the arylsulfonic acid forms a salt with and to neutralize the polyamine. This improves resistance of the composition to precipitation, which is not desirable. The polyamine and the sulfonic acid are also described in U.S. Pat. No. 3,917,466, incorporated by reference herein. It is preferred that the polymeric polyamine be present as a salt, particularly a sulfonic acid salt, for improved resistance to precipitate formation in storage.

In one preferred embodiment of the invention, at least two different polysulfone copolymers are employed in the blend.

The weight ratio of the copolymer of an alkylvinyl monomer and a cationic vinyl monomer to the polysulfone copolymer ranges from about 1/9 to about 9/1. A preferred range is from about 1/1 to about 7/3. Another non-limiting preferred range of weight ratio of the two copolymers is from about 6/4 to about 4/6, more preferably about 1/2 to about 2/1 or even about 1/1. The polysulfone copolymer and the polymeric polyamine may present in a weight ratio of about 100/1 to about 1/100; preferably 50/1 to 1/1; and most preferably from about 20:1 to 1:1. The arylsulfonic acid, if present with the polymeric polyamine, is present in approximately a 1/1 mole ratio with the polyamine to form the salt.

It will be appreciated that it is difficult to predict in advance what an effective amount of antistatic additive composition should be used in any particular hydrocarbon liquid since the effective amount would be dependent upon a number of interrelated factors including, but not necessarily limited to, the nature of the hydrocarbon liquid, the proportions and types of copolymers used in the antistatic additive composition, the effects of other additives in the liquid, etc. Nevertheless, to give a general, non-limiting indication of the expected effective ranges, the total amount of active additive required may be less than 100 ppm, although concentrations of about 20 ppm are considered to be adequate, and in practice, even 3-10 ppm should be sufficient, based on the total amount of liquid hydrocarbon. Preferably, in some embodiments, effective amounts range from about 1-2 ppm. It is generally desirable to use these lower values of concentration, primarily for economic reasons, but also to prevent additive interference with end uses of the treated liquid. Also, lower concentrations are less likely to cause the treated fuel to take up water, as can occur under some conditions when surface-active chemicals are present.

The method of increasing the conductivity of the fuel comprises the addition of one of the above compositions to the fuel or hydrocarbon solvent in a concentration effective to increase the conductivity of the fuel or solvent. The compositions of this invention may be preformulated and added to the fuel or solvent all at once, or the various components can be added separately in any sequence. This method can be carried out efficiently with conventional blending and/or mixing equipment, which is widely available and used in the fuel industry.

This invention therefore achieves anti-static properties in fuels by using compositions that are inexpensive to manufacture, and for preferred embodiments, the constituents are readily available and inexpensive. Common processing equipment can be used, and if a halogen-free form is employed, the need for treatment of hazardous waste halogen-containing by-products is eliminated. Normal combustion of fuel treated with preferred additive compositions of this invention is not adversely affected and does not produce hazardous products such as dioxin or other hazardous halogenated products. Moreover, the very low levels of sulfur in these anti-static compositions result in a product that is more environmentally acceptable than commercially available products containing higher levels of sulfur, particularly sulfur in more offensive forms.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims, which follow the examples. For example, specific combinations of copolymers, other than those specifically tried, in other proportions or ratios or added in different ways, falling within the claimed parameters, but not specifically identified or tried in a particular composition to improve the polymerization inhibition herein, are anticipated to be within the scope of this invention. In the examples all percentages are given on a weight basis unless otherwise indicated.

PREPARATION EXAMPLES A–J

The following materials were blended according to the proportions given in Table I:

Compound α—a hydrocarbon soluble copolymer of an alkylvinyl monomer and a cationic vinyl monomer made according to U.S. Pat. No. 5,672,183.

Compound β—a hydrocarbon soluble copolymer of an alkylvinyl monomer and a nitrile-containing monomer made according to U.S. Pat. No. 5,672,183.

Compound γ—a commercial 50/42 pbw blend of Compound α and Compound β, with 8 parts hydrocarbon solvent, made by Baker Petrolite.

Compound δ—a hydrocarbon soluble polysulfone copolymer of at least one olefin and sulfur dioxide blended with a polyamine made by E. I. duPont de Nemours & Co. according to U.S. Pat. No. 3,917,466.

TABLE I

| | Preparation Examples - Amounts in Grams | | | |
|---|---|---|---|---|
| Blends | Compound α | Compound β | Compound γ | Compound δ |
| A | 10 | — | — | 10 |
| B | 5 | — | — | 15 |
| C | 15 | — | — | 5 |
| D | — | 10 | — | 10 |
| E | — | 5 | — | 15 |
| F | — | 15 | — | 5 |
| G | — | — | 10 | 10 |
| H | — | — | 5 | 15 |
| I | — | — | 15 | 5 |

Blend J was made by diluting 40 wt % Compound α to 30 wt %,which was then blended 1:1 with Compound 8. Some precipitate was observed for Blend F.

Conductivities of samples of the blends in low sulfur diesel (LSD) reference fuels (350 ppm sulfur) are given in Table II, below, in picoSiemens per meter (pS/m).

Fuels made conductive because of additives tend to lose conductivity over time due to environmental conditions such as temperature and perhaps also humidity, and this loss of conductivity may also be due to the specific composition of the fuel, for example, whether it contains a large proportion of polar molecules. However, it will be observed that in this and in other tests reported herein, decreases in conductivity over time of fuels containing additives in accordance with the present invention are not significantly greater than those containing the prior compositions alone and in some cases, the conductivity was unexpectedly observed to increase rather than decrease.

TABLE II

Conductivity Testing for Blends A–J

| Ex. | Blend | Dose (ppm) | Initial | 1 hour | 24 hrs. | 4 days |
|---|---|---|---|---|---|---|
| 1 | A | 5 | 698 | 685 | 475 | 420 |
| 2 | B | 5 | 555 | 535 | 355 | 288 |
| 3 | C | 5 | 416 | 403 | 279 | 237 |
| 4 | D | 5 | 136 | 135 | 97 | — |
| 5 | E | 5 | 200 | 190 | 140 | — |
| 6 | F | 5 | 16 | 18 | 15 | — |
| 7 | G | 5 | 435 | 427 | 283 | 232 |
| 8 | H | 5 | 370 | 362 | 234 | 180 |
| 9 | I | 5 | 500 | 455 | 311 | 266 |
| 10 | Compound δ | 5 | 260 | 246 | 177 | 152 |
| 11 | Compound γ | 5 | 160 | 153 | 89 | 66 |
| 12 | Compound δ | 5 | 263 | 253 | — | — |
| 13 | J | 5 | 596 | 585 | 430 | — |

Blends K through P were made using Compound ε, which is a hydrocarbon soluble copolymer of 1-decene and sulfur dioxide made following the procedures of U.S. Pat. No. 3,917,466. Some precipitate was observed three days later for Blend P.

TABLE III

Further Preparation Examples - Amounts in Grams

| Blends | 25% active Compound ε | 30% active Compound α | Compound γ |
|---|---|---|---|
| K | 10 | 10 | — |
| L | 15 | 5 | — |
| M | 4.67 | 14 | — |
| N | 10 | — | 10 |
| O | 15 | — | 5 |
| P | 5 | — | 15 |

Conductivities of samples of the blends in low sulfur diesel reference fuels (350 ppm sulfur) for 5 ppm doses are given in Table IV, below, in picoSiemens per meter (pS/m).

TABLE IV

Conductivity Testing for Blends K–P

| Ex. | Blend | Initial | 1 hour | 24 hrs. |
|---|---|---|---|---|
| 14 | K | 310 | 296 | 205 |
| 15 | L | 250 | 242 | 182 |
| 16 | M | 282 | 263 | 191 |
| 17 | N | 540 | 436 | 302 |
| 18 | O | 215 | — | — |
| 19 | P | 544 | 392 | 267 |

Further preparation Blends are prepared as shown in Table V. The following materials were used:

TETRAMINE T Solution—25% TETRAMINE T (sold by Akzo Nobel) in 1:1 weight ratio of isopropyl alcohol (IPA) in xylene.

DDBSA—dodecyl benzene sulfonic acid (to neutralize amines.

Solvent 14—aromatic solvent.

TABLE V

Further Preparation Examples - Amounts in Grams

| Blends | 25% active Compound ε | TETRAMINE T Solution | DDBSA | Solvent 14 |
|---|---|---|---|---|
| Q | 7.5 | 10 | 7.5 | 25 |
| R | 7.5 | 15 | 7.5 | 20 |
| S | 8 | 4 | 4 | 11 |

Conductivities of samples of the blends in low sulfur diesel reference fuels (350 ppm sulfur) for 5 ppm doses are given in Table VI, below, in picoSiemens per meter (pS/m).

TABLE VI

Conductivity Testing for Blends Q–S

| Ex. | Blend | Initial | 1 hour |
|---|---|---|---|
| 20 | Q | 98 | 76 |
| 21 | R | 115 | 100 |
| 22 | S | 102 | 86 |

TABLE VII

Further Preparation Examples - Amounts in Grams

| Blends | 30% active Compound α | Compound δ | Compound γ |
|---|---|---|---|
| T | 10 | 10 | — |
| U | — | 5 | 15 |

Some precipitate was observed for Blend U. Conductivities of samples of the blends in kerosene for 5 ppm doses are given in Table VIII, below, in picoSiemens per meter (pS/m). Compound ζ is a commercial hydrocarbon soluble polysulfone copolymer of at least one olefin and sulfur dioxide blended with a polyamine made by E. I. duPont de Nemours & Co. according to U.S. Pat. No. 3,917,466.

TABLE VIII

Conductivity Testing for Blends T, U, K and P in Kerosene

| Ex. | Blend | Initial | 1 hour | 24 hrs. | 5 days |
|---|---|---|---|---|---|
| 23 | T | 1280 | 1300 | 1300 | 1300 |
| 24 | U | 850 | 840 | 850 | 860 |
| 25 | Compound δ | 800 | 765 | 810 | 610 |
| 26 | Compound ζ | 680 | 650 | 840 | 720 |
| 27 | K | 790 | 772 | 750 | 890 |
| 28 | P | 1390 | 1435 | 1580 | 1420 |

PREPARATION EXAMPLES V–Z

A 1:1 weight:weight blend of Compound α diluted with Solvent 14 hydrocarbon solvent was made as follows: 48.2 g Compound α +48.2 g Solvent 14 (50% Compound α.) This material was further blended according to the proportions given in Table IX:

TABLE IX

Preparation Examples - Amounts in Grams

| Blends | 50% Compound α | Compound δ |
|---|---|---|
| V | 10 | 10 |
| W | 11 | 9 |
| X | 12 | 8 |
| Y | 13 | 7 |
| Z | 14 | 6 |

Conductivities of samples of the blends in 5 ppm doses in kerosene are given in Table X, below, in picoSiemens per meter (pS/m). Blend AA was made with 16 g of 50% Compound α and 4 g of Compound δ; Blend BB was made with 17 g of 50% Compound α and 3 g of Compound δ.

TABLE X

Conductivity Testing for Blends V–Z

| Ex. | Blend | Initial | 1 hour | 24 hrs. | 2 days | 3 days | 9 days |
|---|---|---|---|---|---|---|---|
| 29 | V | 1230 | 1140 | 1140 | — | — | — |
| 30 | W | 1100 | 1060 | 1090 | — | — | — |
| 31 | X | 1130 | 1020 | 970 | 1050 | 1010 | 960 |
| 32 | Y | 1030 | 930 | 890 | 940 | 890 | 850 |
| 33 | Z | 1000 | 890 | 840 | 870 | 850 | 770 |
| 34 | Compound δ | 790 | 730 | 840 | 915 | 900 | 850 |
| 35 | Blank | 73 | — | — | — | — | — |
| 36 | AA | 880 | 760 | 670 | | | |
| 37 | BB | 800 | 700 | 590 | | | |

Additional conductivity test results are shown in Table XI for low sulfur diesel reference fuels (350 ppm sulfur) for 5 ppm doses for the indicated blends.

TABLE XI

Conductivity Testing for Blends AA, BB, Z and Compound δ

| Ex. | Blend | Initial | 1 hour | 24 hrs. |
|---|---|---|---|---|
| 38 | Z | 490 | 480 | 365 |
| 39 | Compound δ | 340 | 330 | 250 |

In view of the above, it will be seen that the several advantages of the invention are achieved and other advantageous results attained.

As various changes could be made in the above methods and compositions without departing from the scope of the invention, it is intended that all matter contained in the above description shall be interpreted as illustrative and not in a limiting sense.

I claim:

1. A composition having increased electrical conductivity, comprising
   a) a liquid hydrocarbon;
   b) an anti-static amount of at least one hydrocarbon soluble copolymer of an alkylvinyl monomer and a cationic vinyl monomer, wherein the copolymer has an alkylvinyl monomer unit to cationic vinyl monomer unit ratio of from about 1:1 to about 10:1, the copolymer having an average molecular weight of from about 800 to about 1,000,000; and
   c) an anti-static amount of at least one hydrocarbon soluble polysulfone copolymer of at least one olefin and sulfur dioxide.

2. The composition of claim 1 further comprising d) a polyamine.

3. The composition of claim 2 further comprising e) an aryl sulfonic acid.

4. The composition of claim 1 further comprising an anti-static amount of at least two hydrocarbon soluble polysulfone copolymers, each of at least one olefin and sulfur dioxide.

5. The composition of claim 1 where the weight ratio of copolymer of an alkylvinyl monomer and a cationic vinyl monomer to polysulfone copolymer ranges from about 1/9 to about 9/1.

6. The composition of claim 1 where in b) the cationic vinyl monomer is a cationic quaternary ammonium vinyl monomer.

7. The composition of claim 1 where in b) the cationic vinyl monomer is selected from the group consisting of a cationic quaternary ammonium acrylate monomer and a cationic quaternary ammonium methacrylate monomer.

8. The composition of claim 1 where in b) the cationic vinyl monomer corresponds to the formula:

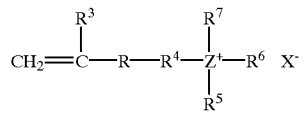

where Z is selected from the group consisting of nitrogen, phosphorus and sulfur, $X^-$ is a nonhalogen atom, R is selected from the group consisting of —C(=O)O—, —C(=O)NH—, straight chain and branched alkylene groups, divalent aromatic groups and divalent alicyclic groups, $R^3$ is selected from the group consisting of hydrogen and methyl, $R^4$ is a straight chain or branched alkylene group of up to about twenty carbon atoms, and $R^5$, $R^6$ and $R^7$ are independently each a straight chain or branched alkyl group of up to about twenty carbon atoms, provided however that if Z is sulfur $R^7$ is absent.

9. The composition of claim 1 further comprising a copolymer of an alkyl vinyl monomer and a nitrile-containing monomer.

10. The composition of claim 1 where the c) hydrocarbon soluble polysulfone copolymer of at least one olefin and sulfur dioxide comprises about 50 mol percent of units from sulfur dioxide, about 40 to 50 mol percent of units derived from one or more 1-alkenes each having from about 6 to 24 carbon atoms, and from about 0 to 10 mol percent of units derived from an olefinic compound having the formula AGH=CHB wherein A is a group having the formula —(C$_x$H$_{2x}$)—COOH wherein x is from 0 to about 17, and B is hydrogen or carboxyl, with the proviso that when B is carboxyl, x is 0, and wherein A and B together can be a dicarboxylic anhydride group.

11. The composition of claim 2 where the d) polyamine has the formula

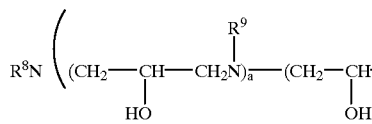 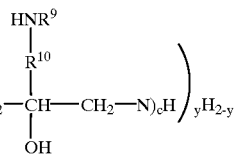

where
R⁹ is an aliphatic hydrocarbyl group of 8 to 24 carbon atoms, $R^{10}$ is an alkylene group of 2 to 6 carbon atoms, $R^8$ is $R^9$, or an n-aliphatic hydrocarbyl alkylene group of the formula $R^9NHR^{10}$,
a is an integer of 0 to 20,
b is an integer of 0 to 20,
c is an integer of 0 to 20, and
y is an integer of 1 to 2,
with the proviso that when $R^8$ is $R^9$ then a is an integer of 2 to 20 and b=c=0, and when R is $R^9NH—R^{10}$ then a is 0 and b+c is an integer of 2 to 20.

12. A composition having increased electrical conductivity, comprising
a) a liquid hydrocarbon;
b) an anti-static amount of at least one hydrocarbon soluble copolymer of an alkylvinyl monomer and a cationic vinyl monomer, wherein the copolymer has an alkylvinyl monomer unit to cationic vinyl monomer unit ratio of from about 1:1 to about 10:1, the copolymer having an average molecular weight of from about 800 to about 1,000,000; and
c) an anti-static amount of at least one hydrocarbon soluble polysulfone copolymer of at least one olefin and sulfur dioxide further comprising about 50 mol percent of units from sulfur dioxide, about 40 to 50 mol percent of units derived from one or more 1-alkenes each having from about 6 to 24 carbon atoms, and from about 0 to 10 mol percent of units derived from an olefinic compound having the formula ACH=CHB wherein A is a group having the formula —$(C_xH_{2x})$—COOH wherein x is from 0 to about 17, and B is hydrogen or carboxyl, with the proviso that when B is carboxyl, x is 0, and wherein A and B together can be a dicarboxylic anhydride group
where the weight ratio of copolymer of an alkylvinyl monomer and a cationic vinyl monomer to polysulfone copolymer ranges from about 1/9 to about 9/1.

13. The composition of claim 12 further comprising d) a polyamine.

14. The composition of claim 13 further comprising e) an aryl sulfonic acid.

15. The composition of claim 12 where in b) the cationic vinyl monomer is a cationic quaternary ammonium vinyl monomer.

16. The composition of claim 12 where in b) the cationic vinyl monomer is selected from the group consisting of a cationic quaternary ammonium acrylate monomer and a cationic quaternary ammonium methacrylate monomer.

17. A composition for improving the anti-static property of a liquid hydrocarbon comprising:
a) an anti-static amount of at least one hydrocarbon soluble copolymer of an alkylvinyl monomer and a cationic vinyl monomer, wherein the copolymer has an alkylvinyl monomer unit to cationic vinyl monomer unit ratio of from about 1:1 to about 10:1, the copolymer having an average molecular weight of from about 800 to about 1,000,000; and
b) an anti-static amount of at least one hydrocarbon soluble polysulfone copolymer of at least one olefin and sulfur dioxide.

18. The composition of claim 17 further comprising d) a polyamine.

19. The composition of claim 18 further comprising e) an aryl sulfonic acid.

20. The composition of claim 17 where the weight ratio of copolymer of an alkylvinyl monomer and a cationic vinyl monomer to polysulfone copolymer ranges from about 1/9 to about 9/1.

21. The composition of claim 17 further comprising a copolymer of an alkyl vinyl monomer and a nitrile-containing monomer.

22. A composition for improving the anti-static property of a liquid hydrocarbon comprising:
a) an anti-static amount of at least one hydrocarbon soluble copolymer of an alkylvinyl monomer and a cationic vinyl monomer, wherein the copolymer has an alkylvinyl monomer unit to cationic vinyl monomer unit ratio of from about 1:1 to about 10:1, the copolymer having an average molecular weight of from about 800 to about 1,000,000; and
b) an anti-static amount of at least one hydrocarbon soluble polysulfone copolymer of at least one olefin and sulfur dioxide further comprising about 50 mol percent of units from sulfur dioxide, about 40 to 50 mol percent of units derived from one or more 1-alkenes each having from about 6 to 24 carbon atoms, and from about 0 to 10 mol percent of units derived from an olefinic compound having the formula ACH=CHB wherein A is a group having the formula —$(C_xH_{2x})$—COOH wherein x is from 0 to about 17, and B is hydrogen or carboxyl, with the proviso that when B is carboxyl, x is 0, and wherein A and B together can be a dicarboxylic anhydride group.
where the weight ratio of copolymer of an alkylvinyl monomer and a cationic vinyl monomer to polysulfone copolymer ranges from about 1/9 to about 9/1.

23. The composition of claim 22 further comprising d) a polyamine.

24. The composition of claim 22 further comprising e) an aryl sulfonic acid.

25. The composition of claim 22 further comprising a copolymer of an alkyl vinyl monomer and a nitrile-containing monomer.

26. A composition for improving the anti-static property of a liquid hydrocarbon comprising:
a) an anti-static amount of at least one hydrocarbon soluble copolymer corresponding to the formula:

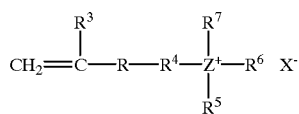

where Z is selected from the group consisting of nitrogen, phosphorus and sulfur, $X^-$ is a nonhalogen atom, R is selected from the group consisting of —C(=O)O—, —C(=O)NH—, straight chain and branched alkylene groups, divalent aromatic groups and divalent alicyclic groups, $R^3$ is selected from the group consisting of hydrogen and methyl, $R^4$ is a straight chain or branched alkylene group of up to about twenty carbon atoms, and $R^5$, $R^6$ and $R^7$ are independently each a straight chain or branched alkyl group of up to about twenty carbon atoms, provided however that if Z is sulfur $R^7$ is absent; and b) an anti-static amount of at least one hydrocarbon soluble polysulfone copolymer of at least one olefin and sulfur dioxide further comprising about 50 mol percent of units from sulfur dioxide, about 40 to 50 mol percent of units derived from one or more 1-alkenes each having from about 6 to 24 carbon atoms, and from about 0 to 10 mol percent of units derived from an olefinic compound having the formula ACH=CHB wherein A is a group having the formula —$(C_xH_{2x})$—COOH wherein x is from 0 to about 17, and B is hydrogen or carboxyl, with the proviso that when B is carboxyl, x is 0, and wherein A and B together can be a dicarboxylic anhydride group.

where the weight ratio of copolymer of an alkylvinyl monomer and a cationic vinyl monomer to polysulfone copolymer ranges from about 1/1.

27. A method for improving the anti-static property of a liquid hydrocarbon comprising:

a) providing a hydrocarbon fuel;
b) adding to the hydrocarbon fuel, in any order:
   i) an anti-static amount of at least one hydrocarbon soluble copolymer of an alkylvinyl monomer and a cationic vinyl monomer, wherein the copolymer has an alkylvinyl monomer unit to cationic vinyl monomer unit ratio of from about 1:1 to about 10:1, the copolymer having an average molecular weight of from about 800 to about 1,000,000; and
   ii) an anti-static amount of at least one hydrocarbon soluble polysulfone copolymer of at least one olefin and sulfur dioxide.

* * * * *

UNITED STATES PATENT AND TRADEMARK OFFICE
CERTIFICATE OF CORRECTION

PATENT NO. : 6,391,070 B2
DATED : May 21, 2002
INVENTOR(S) : John A. Schield

It is certified that error appears in the above-identified patent and that said Letters Patent is hereby corrected as shown below:

Column 6,
Line 63, please delete "Compound 8" and insert -- Compound δ --.

Column 10,
Line 59, please delete "AGH = CHB" and insert -- ACH = CHB --.

Signed and Sealed this

Tenth Day of August, 2004

JON W. DUDAS
*Acting Director of the United States Patent and Trademark Office*